Feb. 7, 1928.

E. N. LONG, JR 1,658,451

TIRE CHANGING TOOL

Filed Sept. 3, 1926

Inventor,
Everett N. Long Jr.,

Witness:

Patented Feb. 7, 1928.

1,658,451

UNITED STATES PATENT OFFICE.

EVERETT N. LONG, JR., OF AVALON, CALIFORNIA.

TIRE-CHANGING TOOL.

Application filed September 3, 1926. Serial No. 133,354.

Figure 1:
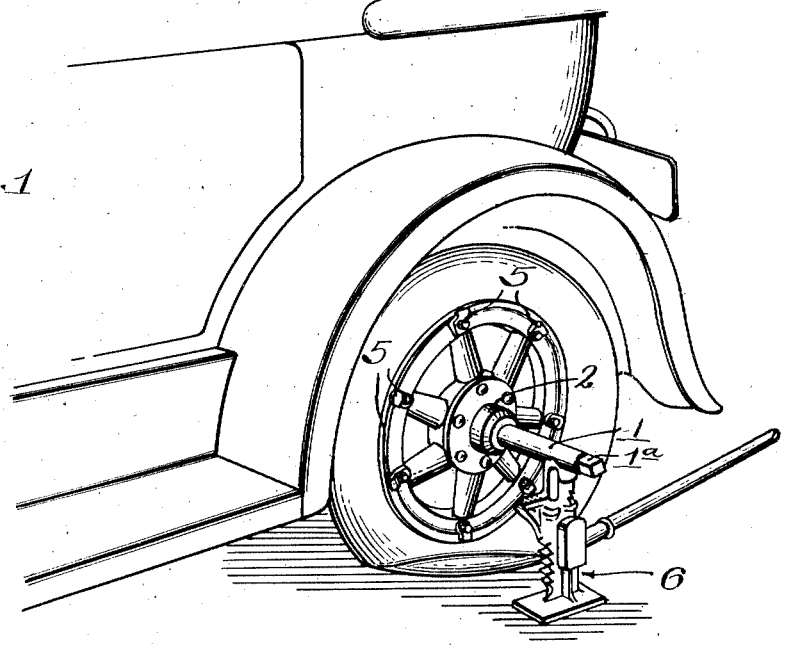
Figure 2:
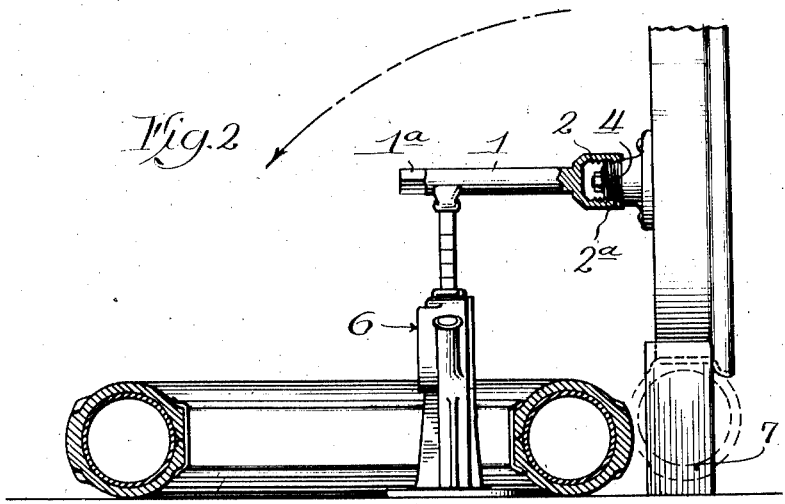

This invention relates to improvements in tire changing tools and more particularly to a tool to be used in conjunction with a jack for lifting the wheel from a tire rim to be removed. The character of the tool and its application is illustrated in the accompanying drawing, in which Figure 1 is a perspective view of the tool, applied to the wheel of a vehicle, and Figure 2 is a view in side elevation of the tool applied to the hub of the wheel, and a jack in lifting contact therewith.

The tool comprises in general an elongated shank 1 having an integral cup-shaped member 2 at one end opening endwise and arranged axially of the shank, and at the other end with a square or hexagonal portion $1^a$ to take a wrench. The cylindric marginal portion of the cup-shaped member is provided with internal threads $2^a$, the diameter of this portion as well as the size and number of threads being the same as those of the hub threaded portion 4 of the vehicle for which a particular tool is designed.

The tool is preferably about ten inches long, one inch in diameter at the shank, with the walls of the cup-shaped portion 2 about one-half an inch in thickness, although its size and dimensions may be varied somewhat, depending on the weight of the vehicle with which it is to be used. The tool would be made of a suitable grade of steel such as is ordinarily used for tool making purposes.

The method of using the tool is clearly illustrated. Assuming that a tire change is to be made, the usual operation of loosening the rim holding lugs 5 is performed, this being preferably done before jacking up the wheel so that the final removal of the lugs can be later performed with the fingers. The hub cap of the wheel (not shown) is then removed by means of a wrench and the tool is screwed tightly on to the hub, the shank 1 thus forming a solid extension of the hub beyond the wheel. A jack 6 is then placed under the outer end of the shank and operated in the usual way to lift the wheel from the ground so that the rim and tire to be removed can be demounted. Since the tire rim encircles the tool and jack, it is necessary to loosen and remove the jack so that the rim can be removed, the rimless wheel in the meantime being preferably supported above the ground on a block 7, carried for that purpose. Before replacing the jack under the tool the rim and tire to be put on, is laid on the ground and the jack placed inside of it, thus when the wheel has again been elevated the rim can be readily lifted and mounted on the wheel.

The purpose of this tool is to obviate the necessity of placing the jack underneath the axle as has always been the usual practice, but which is rendered difficult in the present construction of motor vehicles, owing to the prevalent use of large diameter tires known as "balloon" tires, which, when deflated allow the axle to drop so close to the ground as to make it difficult for a jack to be placed underneath. Moreover, the use of bumpers at front and rear not only increases the difficulty of placing a jack underneath the axle or frame members, but makes it impossible to operate the jack without using an exceedingly long handle.

With the use of a tool of the character described, the operation of changing a tire is greatly simplified and much of the attending annoyance eliminated. It is contemplated that these tools would be made for various makes of vehicles and differing, as already suggested, with the weight of such vehicles as well as the diameter of the hub and the size of threads used for the hub-caps.

Having illustrated and described the tool embodying the invention, together with its use and advantages,

I claim as my invention:

A tire changing tool comprising a solid shank having an internally threaded cup shaped portion at one end thereof, said tool being adapted to replace the hub cap of a vehicle wheel with said cup shaped portion engaging the threaded portion of said hub and said shank extending outwardly from said wheel in alignment with the axis thereof to engage a lifting jack supported on the ground beneath said shank.

Signed at Avalon, this 6 day of August, 1926.

EVERETT N. LONG, Jr.